(12) United States Patent
Khoury et al.

(10) Patent No.: US 7,868,804 B2
(45) Date of Patent: Jan. 11, 2011

(54) HIGH SPEED DRIVER EQUALIZATION

(75) Inventors: Elie Khoury, Gilbert, AZ (US); D. C. Sessions, Phoenix, AZ (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 11/996,325

(22) PCT Filed: Jul. 26, 2006

(86) PCT No.: PCT/IB2006/052568

§ 371 (c)(1),
(2), (4) Date: Nov. 14, 2008

(87) PCT Pub. No.: WO2007/013037

PCT Pub. Date: Feb. 1, 2007

(65) Prior Publication Data

US 2009/0179682 A1    Jul. 16, 2009

Related U.S. Application Data

(60) Provisional application No. 60/702,721, filed on Jul. 26, 2005.

(51) Int. Cl.
*H03M 1/66* (2006.01)
(52) U.S. Cl. ........................ 341/144; 375/257
(58) Field of Classification Search .............. 341/144, 341/141; 375/229, 257; 326/26, 27; 327/108, 327/112
See application file for complete search history.

(56) References Cited

U.S. PATENT DOCUMENTS

| 5,148,163 | A  | * | 9/1992 | Frindle .................. 341/131 |
| 6,265,920 | B1 |   | 7/2001 | Gauthier |
| 6,674,313 | B2 | * | 1/2004 | Kurisu et al. .............. 327/108 |
| 7,164,299 | B2 | * | 1/2007 | Nedachi .................. 327/112 |
| 7,345,602 | B2 | * | 3/2008 | Saeki et al. .............. 341/101 |
| 7,348,794 | B2 | * | 3/2008 | Tanaka .................... 326/26 |
| 2004/0124888 | A1 |   | 7/2004 | Radelinow |
| 2005/0018778 | A1 |   | 1/2005 | Chang |

(Continued)

FOREIGN PATENT DOCUMENTS

EP    2006/052568    1/2008

OTHER PUBLICATIONS

Lui, Jin; et al "Equalization in High-Speed Communication Systems" IEEE Circuits and Systems Magazine, vol. 4, No. 2, 2004, pp. 4-17.

*Primary Examiner*—Peguy JeanPierre

(57) ABSTRACT

The present invention relates to emphasizing and de-emphasizing of an analog data signal. Using a main analog driver a data signal indicative of bit values of binary data is converted into a first analog data signal. A second data signal is determined by delaying the data signal a predetermined time interval and inverting the delayed data signal. Using a de-emphasis driver, the second data signal are converted into a second analog data signal, wherein the second analog data signal is additive to the first analog data signal if the data signal and the second data signal are indicative of a same bit value, and wherein the second analog data signal is subtractive to the first analog data signal if the data signal and the second data signal are indicative of an opposite bit value. The first analog data signal is emphasized or de-emphasized by superposing the first analog data signal and the second analog data signal.

27 Claims, 5 Drawing Sheets

U.S. PATENT DOCUMENTS

2005/0068060 A1    3/2005  Ooshita et al.
2007/0041455 A1*   2/2007  Tran et al. .................. 375/257
2007/0253475 A1*  11/2007  Palmer ....................... 375/229
2007/0285120 A1*  12/2007  Venditti et al. ................ 326/30

* cited by examiner

# HIGH SPEED DRIVER EQUALIZATION

This invention relates generally to transmission of high-speed serial binary data over a copper line, and in particular to driver equalization for reducing inter-symbol interference.

Low Voltage Differential Signaling (LVDS) is used for high speed—Multi-Gigabit per second—serial transmission of binary data over copper transmission lines. It is widely adopted in telecommunication equipment because of its immunity to crosstalk noise, low electromagnetic interference, and low power dissipation.

However, an increasing number of interconnections in high speed telecommunication systems increase inter-symbol interference. A main cause of inter-symbol interference in high speed serial links is attenuation and dispersal of frequency components during signal propagation through a transmission line resulting in a loss of amplitude of signal pulses and their displacement in time.

In order to reduce the inter-symbol interference, driver equalization is applied. In driver equalization output power of a LVDS driver is controlled such that when a bit transition occurs the transmitted power is at maximum level, and when no bit transition occurs the output power is decreased. This results in an equalized amplitude of all sent signal pulses—bits—at a termination point. For instance, PCI_Express specifications define this equalization as a signal de-emphasis for subsequent bits of same polarity bits. The subsequent voltage level is reduced differentially by 3.5 dB.

The driver equalization is realized using digital filters as disclosed, for example, in U.S. Pat. No. 6,265,920 issued Jul. 24, 2001 to Gauthier, in US Patent Application 2004/0124888, and in US Patent Application 2005/0018778. However, the designs disclosed are very complex resulting in substantial manufacturing costs.

It would be desirable to provide a simple design for driver equalization that is reliable and cost effective to manufacture.

It is, therefore, an object of embodiments of the invention to provide a driver equalization using a simplified digital filter.

It is further an object of embodiments of the invention to provide driver equalization for use in a high speed differential driver.

It is yet further an object of embodiments of the invention to provide driver equalization that produces desired signal de-emphasis while maintaining output impedance approximately constant.

In accordance with the present invention there is provided a method for performing one of emphasizing and de-emphasizing of an analog data signal comprising:

receiving a data signal, the data signal being indicative of bit values of binary data; using a main analog driver, converting the data signal into a first analog data signal; determining a second data signal by delaying the data signal a predetermined time interval and inverting the delayed data signal; using a de-emphasis driver, converting the second data signal into a second analog data signal, wherein the second analog data signal is additive to the first analog data signal if the data signal and the second data signal are indicative of a same bit value, and wherein the second analog data signal is subtractive to the first analog data signal if the data signal and the second data signal are indicative of an opposite bit value; and, performing one of emphasizing and de-emphasizing of the first analog data signal by superposing the first analog data signal and the second analog data signal.

In accordance with the present invention there is further provided a system for performing one of emphasizing and de-emphasizing of an analog data signal comprising: an input port for receiving a data signal, the data signal being indicative of bit values of binary data; a main analog driver in signal communication with the input port for converting the data signal into a first analog data signal; de-emphasis circuitry in signal communication with the input port for determining a second data signal by delaying the data signal a predetermined time interval and inverting the delayed data signal; a de-emphasis driver in signal communication with the de-emphasis circuitry and coupled in parallel to the main analog driver, the de-emphasis driver for converting the second data signal into a second analog data signal, wherein the second analog data signal is additive to the first analog data signal if the data signal and the second data signal are indicative of a same bit value, and wherein the second analog data signal is subtractive to the first analog data signal if the data signal and the second data signal are indicative of an opposite bit value; and, an output port in signal communication with the main analog driver and the de-emphasis analog driver, the output port for superposing the first analog data signal and the second analog data signal producing one of an emphasized and de-emphasized first analog data signal. In accordance with the present invention there is further provided a storage medium having data stored therein, the data for when executed resulting in an integrated circuit design of a system for performing one of emphasizing and de-emphasizing of an analog data signal comprising: an input port for receiving a data signal, the data signal being indicative of bit values of binary data; a main analog driver in signal communication with the input port for converting the data signal into a first analog data signal; de-emphasis circuitry in signal communication with the input port for determining a second data signal by delaying the data signal a predetermined time interval and inverting the delayed data signal; a de-emphasis driver in signal communication with the de-emphasis circuitry and coupled in parallel to the main analog driver, the de-emphasis driver for converting the second data signal into a second analog data signal, wherein the second analog data signal is additive to the first analog data signal if the data signal and the second data signal are indicative of a same bit value, and wherein the second analog data signal is subtractive to the first analog data signal if the data signal and the second data signal are indicative of an opposite bit value; and, an output port in signal communication with the main analog driver and the de-emphasis analog driver, the output port for superposing the first analog data signal and the second analog data signal producing one of an emphasized and de-emphasized first analog data signal.

Exemplary embodiments of the invention will now be described in conjunction with the following drawings, in which.

Figure 1:
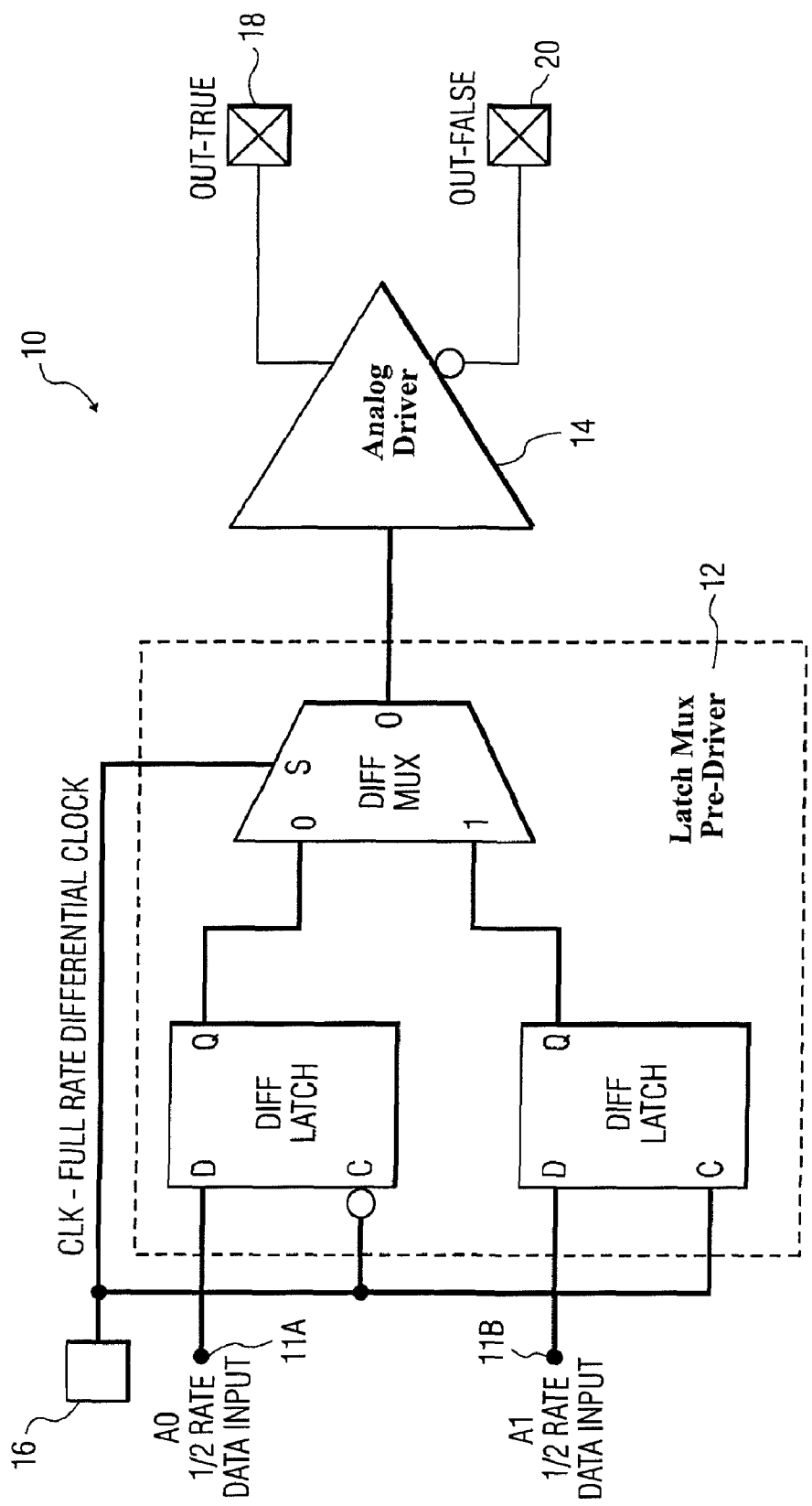
FIG. 1 is a simplified block diagram illustrating a SLVS driver.

In order to provide a better understanding of the driver equalization according to the invention, a SLVS driver for implementing a preferred embodiment will be described in the following. FIG. 1 shows a simplified block diagram of the SLVS driver comprising a latch-mux predriver 12 and an analog driver 14. The latch-mux predriver 12 receives two ½ rate—speed—data signals A0 and A1 at input ports 11A and 11B and multiplexes them into a full rate data signal using a full rate differential clock signal CLK with period T received from clock 16. The full rate data signal is then provided to the analog driver 14. The latch-mux predriver 12 de-couples the data signals—A0 and A1—from a high speed transmission path coupled to output ports 18 and 20 of the analog driver 14.

It is noted that in the following description all signals are differential signals and are referred to by signal name only for sake of clarity. In operation, the latch-mux predriver 12 latches the signal A1 when, for example, the clock signal CLK is "high" and transmits the signal A0, which has been latched during a previous ½ cycle. Correspondingly, the latch-mux predriver 12 latches the signal A0 when the clock signal CLK is "low" and transmits the signal A1, which has been latched during a previous ½ cycle. Therefore, every ½ period T one bit is transmitted, which is known as double data rate or DDR.

Figure 2:
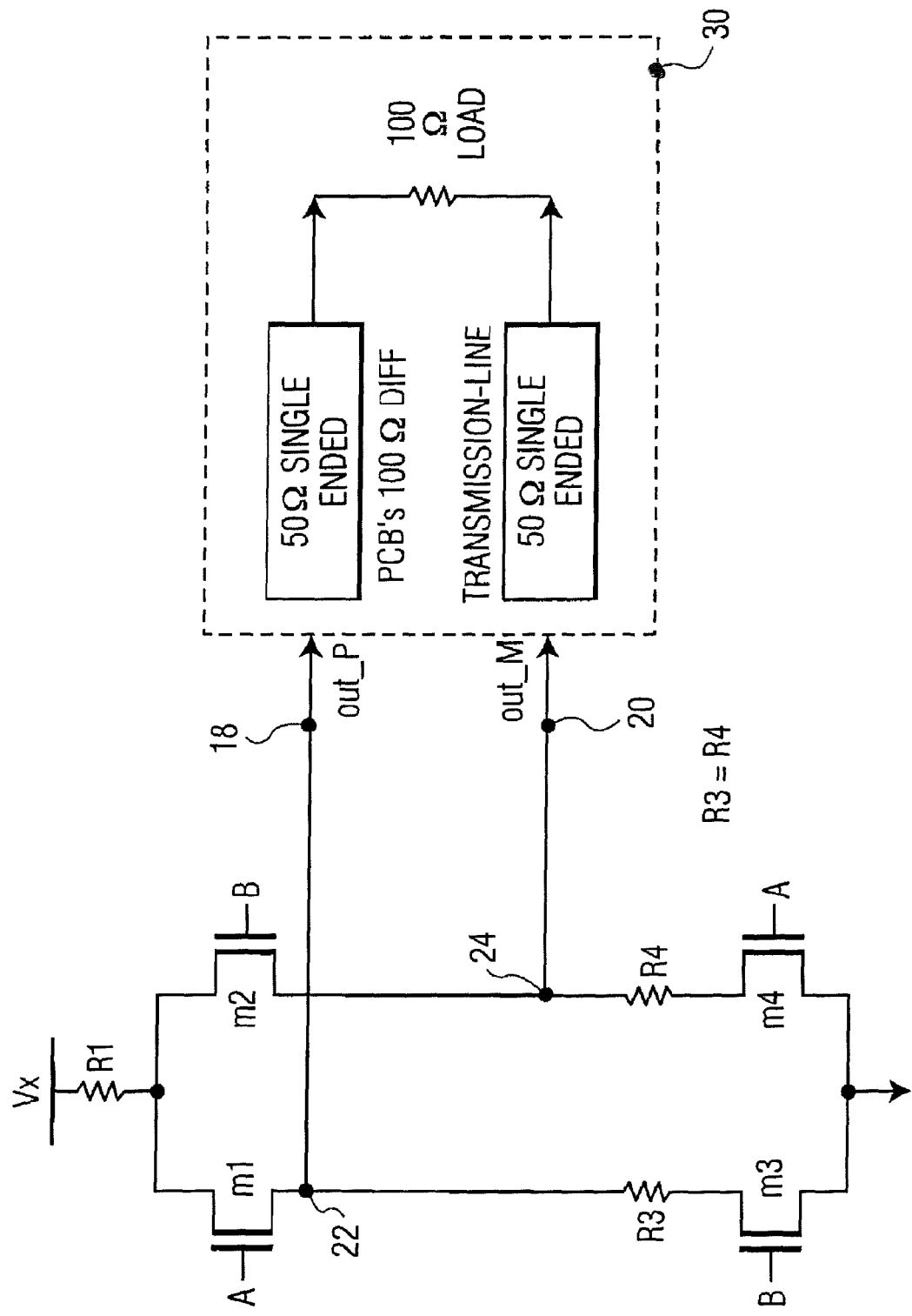
FIG. 2 is a simplified circuit diagram illustrating an all Nmos push-pull 50 voltage source D2A driver for use in the SLVS driver shown in FIG. 1.

The analog driver 14 then converts the output signal of the latch-mux predriver 12 into, for example, an analog low swing voltage of, preferably, 400 mV to 600 mV. Referring to FIG. 2, a simplified circuit diagram of an all Nmos push-pull 50 voltage source D2A driver, preferred for use as analog driver 14, is shown. Of course, it is possible to employ other types of analog drivers for implementing the equalization according to the invention. The D2A driver comprises four transistors m1 to m4 with bases of transistors m1 and m4 being coupled for receiving component A of the predriver output signal and with the bases of transistors m2 and m3 being coupled for receiving component B of the differential predriver output signal. Collectors of the transistors m1 and m2 are coupled to supply plane Vx via resistor R1, while emitters of the transistors m1 and m2 are coupled to collectors of transistors m3—via resistor R3—and m4—via resistor R4, respectively. Emitters of the transistors m3 and m4 are coupled to a ground. Output signals out_P and out_M are provided via ports 18 and 20, respectively, coupled to transmission line 30. The port 18 is coupled to node 22 interposed between the emitter of the transistor m1 and the resistor R3, while the port 20 is coupled to node 24 interposed between the emitter of the transistor m2 and the resistor R4.

There are two cases of operation of the D2A driver. In case 1, the signal component A is "high" while the signal component B is "low". This results in the transistors m1 and m4 being "ON" while the transistors m2 and m3 are "OFF". Output impedance on each port 18 and 20 is 50. The output impedance is between the port 18 and the supply plane Vx, and between the port 20 and the ground, respectively. The combination of the resistor R1 in series with the transistor m1, and of the resistor R4 in series with the transistor m4 results in the 50 impedance. Therefore, an equivalent differential impedance between the ports 18 and 20 is 100, as shown in FIG. 2. It is noted that, preferably, the resistors R3 and R4 have a same resistance. Each of the ports 18 and 20 is designed to drive a 50 transmission line, a de-coupling capacitor—75 nF to 200 nF—and a 50 resistor to ground at a receiving end. In case 1, current flows from the supply plane Vx via the resistor R1, the transistor m1 and the port 18 into the transmission line 30, and from the transmission line 30 into the port 20 and via the resistor R4 and the transistor m4 to ground. In case 2, current flows from the supply plane Vx via the resistor R1, the transistor m2 and the port 20 into the transmission line 30, and from the transmission line 30 into the port 18 and via the resistor R3 and the transistor m3 to the ground.

In high speed data signal transmission an amplitude of a signal corresponding to a first bit is pre-emphasized, while amplitudes of the signal corresponding to second and consecutive bits of a same value of the first bit are de-emphasized by a predetermined amount. In case of PCI_Express the amount is 3.5 dB+/−0.5 dB. Employment of the pre-emphasis and the corresponding de-emphasis enhances signal quality of high speed signal transmission and reduces losses and inter-symbol interference. The pre-emphasis and the corresponding de-emphasis of signal pulses are implemented in driver equalization.

Figure 3:
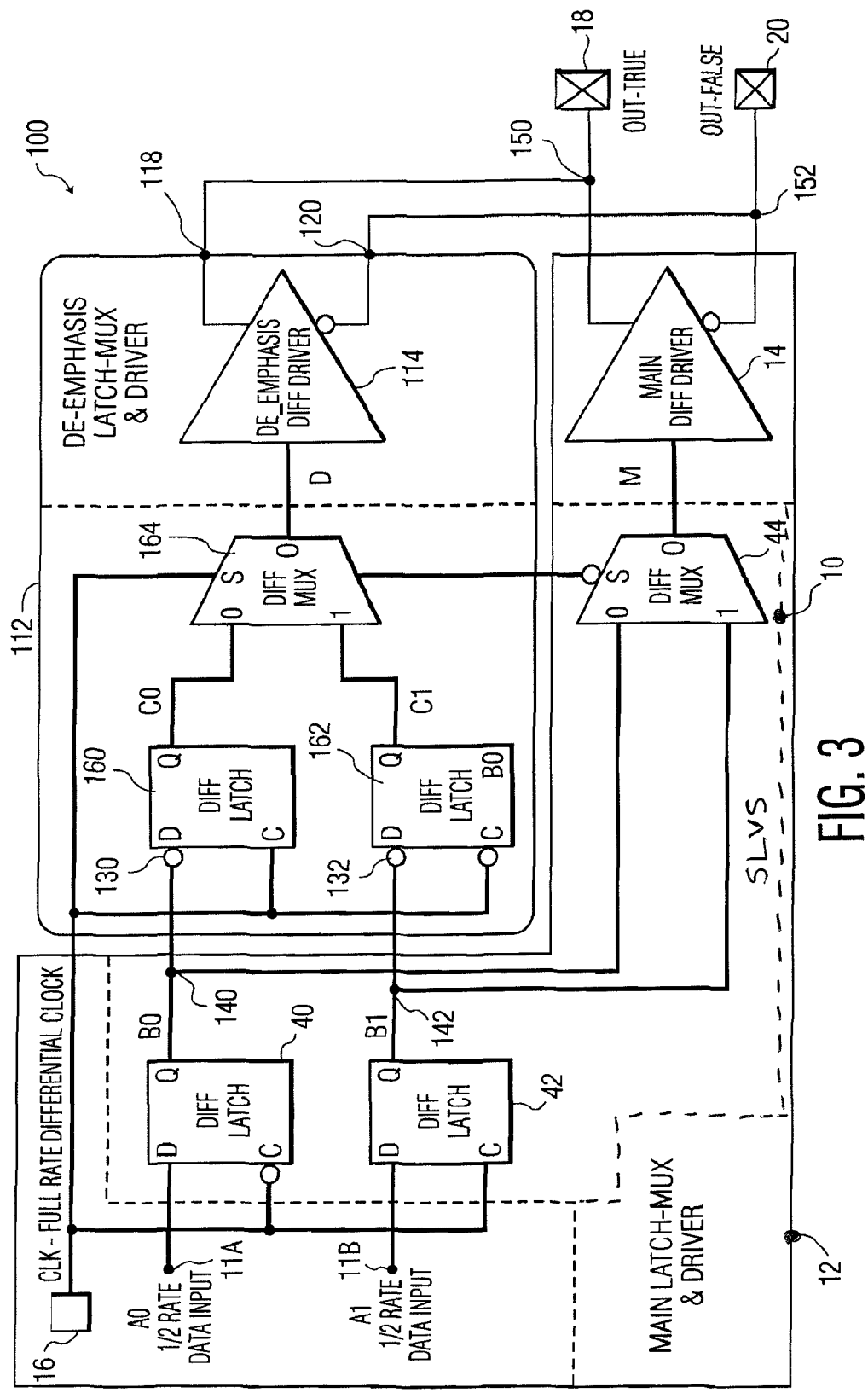
FIG. 3 is a simplified block diagram illustrating the SLVS driver shown in FIG. 1 with a de-emphasis unit according to the invention.

Referring now to FIG. 3, a simplified block diagram of the SLVS driver 10—shown in FIG. 1—with a de-emphasis unit 100 for driver equalization according to an embodiment of the invention is shown. The de-emphasis unit 100 comprises a second latch-mux predriver 112 and a de-emphasis driver 114. As is evident, the de-emphasis unit 100 is of simple design, preferably, comprising substantially duplicates in design of the latch-mux predriver 12 and the main analog driver 14. Input ports 130 and 132 of the second latch-mux predriver 112 are coupled to nodes 140 and 142, respectively. The nodes 140 and 142 are interposed between output ports of differential latches 40 and 42, respectively, and corresponding input ports of differential multiplexer 44 of the latch-mux predriver 12. An input signal is provided to the input ports 130 and 132 in an inverted fashion, which is accomplished in the differential design by simply switching the input ports. The de-emphasis driver 114 is coupled to the main analog driver 14 in a parallel fashion, i.e. ports 118 and 120 of the de-emphasis driver 114 are coupled to ports 18 and 20, respectively. Furthermore, the differential latches 40 and 42, and differential multiplexer 44 of the second latch-mux predriver 112 are coupled to the clock 16 for receiving the clock signal CLK.

To achieve de-emphasis, inverted and delayed versions of input data signals A0 and A1 are latched on an opposite clock phase. Since the differential latches 40 and 42 of the latch-mux predriver 12, and differential latches 160 and 162 of the second latch-mux predriver 112 are operated in DDR format, the input data signals A0 and A1 are first latched in a first half period—latches 40 and 42—and then inverted and latched in a second half period—latches 160 and 162—of a same clock cycle. When the input data signals A0 and A1 are same, i.e. both signals corresponding to 0 or 1, and are sampled consecutively, the output signals of the two differential multiplexers 44 and 164 then have opposite polarity resulting in a subtractive output signal of the drivers 14 and 114. It is noted that, here, subtractive is considered being equivalent to destructive summing, whereas additive is considered being equivalent to constructive summing. Thus, the output signal provided at ports 18 and 20 is de-emphasized. When the input data signals A0 and A1 are opposite, i.e. one signal corresponding to 0 and the other to 1, and are sampled consecutively, the output signals of the two differential multiplexers 44 and 164 then have same polarity resulting in an additive output signal of the drivers 14 and 114. Thus, the output signal provided at ports 18 and 20 is pre-emphasized. The inverted and delayed versions of the input signals have a simple digital weight factor of −1, which substantially simplifies the pre-emphasis/de-emphasis process by moving it into the analog domain of the drivers 14 and 114.

Figure 4:
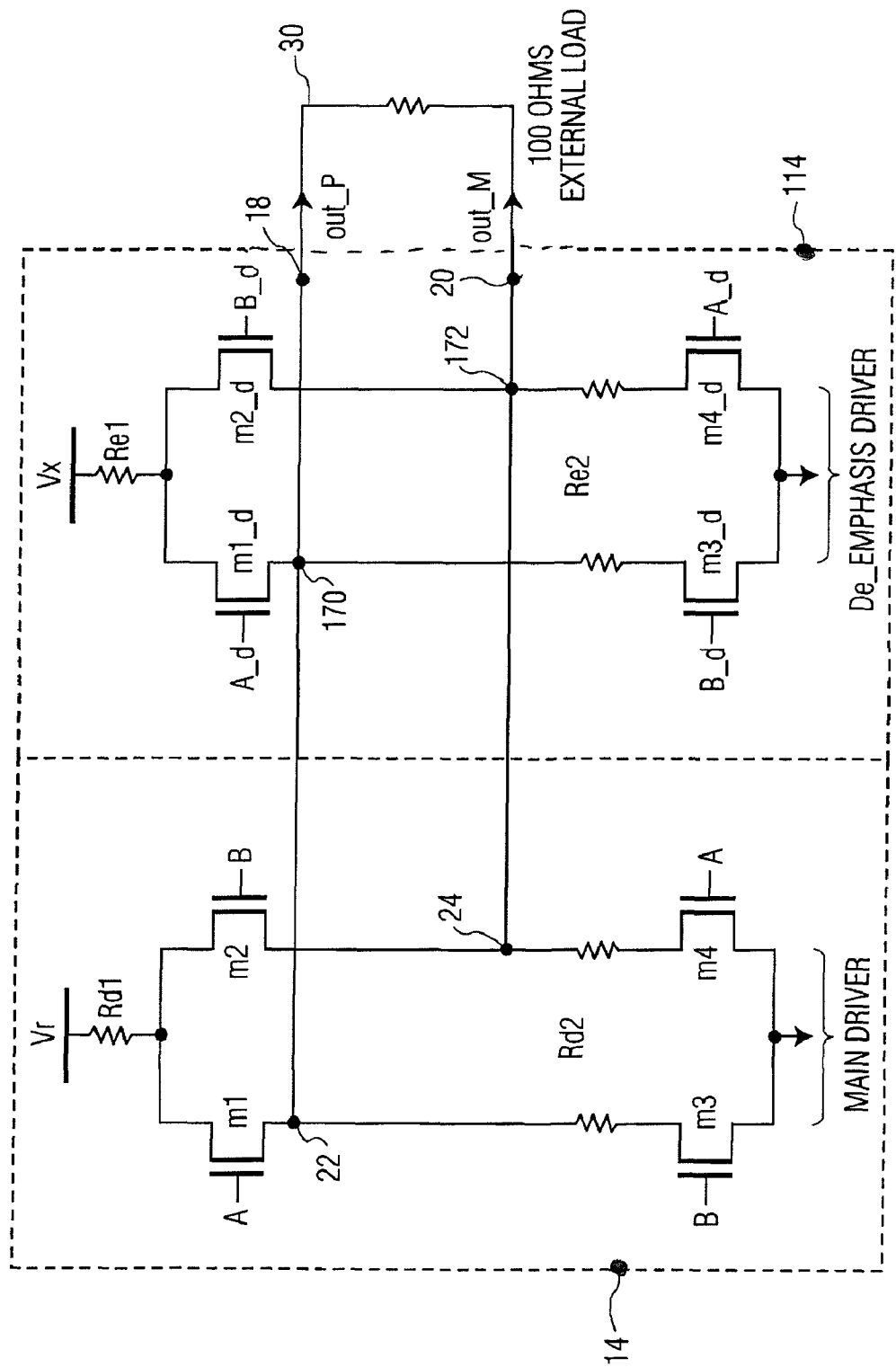
FIG. 4 is a simplified circuit diagram illustrating a pair of all Nmos push-pull 50 voltage source D2A drivers according to the invention for use in the SLVS driver shown in FIG. 3; and, FIG. 5 is a simplified timing diagram schematically illustrating operation of the SLVS driver with de-emphasis unit shown in FIG. 3.

Referring to FIG. 4, a simplified circuit diagram of the main analog driver 14 and a de-emphasis driver 114 coupled in parallel at the output side according to the invention is shown. Preferably, both drivers are all NMOS push-pull 50 voltage source D2A drivers, but the invention is not limited thereto. For sake of clarity in the present description all transistors, are considered as ideal switches, i.e. having zero resistance when "ON". Both drivers 14 and 114 comprise substantially similar circuitry as the one shown for driver 14 in FIG. 2, except for some changes in the notation of the components in order to facilitate the following description. Here, resistor R1 in FIG. 2 is now named Rd1 for the main driver 14 and Re1 for the de-emphasis driver 114. Further, resistors R3 and R4—having both a same resistance—are named Rd2 for the main driver 14 and Re2 for the de-emphasis driver 114. The transistors for the de-emphasis driver 114 are named m1_d to m4_d with the numbering corresponding to the one used for the main driver 14. The bases of the transistors m1_d to m4_d are coupled for receiving predriver output signal components A_d and B_d from the second latch-mux predriver 112. Output signals out_P and out_M are provided via ports 18 and 20, respectively, coupled to transmission line 30. The port 18 is coupled to node 22 interposed between the emitter of the transistor m1 and the resistor Rd2 of the main driver 14, as well as to node 170 interposed between the emitter of the transistor m1_d and the resistor Re2 of the de-emphasis driver 114. The port 20 is coupled to node 24 interposed between the emitter of the transistor m2 and the resistor Rd2 of the main driver 14, as well as to node 172 interposed between the emitter of the transistor m2_d and the resistor Re2 of the de-emphasis driver 114.

When the output signals of the two differential multiplexers 44 and 164 are the same—in-phase, i.e. A=A_d and B=B_d—the drivers 14 and 114 are in high drive mode and the output signal level—differential voltage—is at maximum. This corresponds to the emphasized state. During the emphasized state—and for instance if A=A_d=1 and B=B_d=0–the output impedance is determined as follows:

Rpu (pull up)=(Rd1 in series with m1) in parallel with (Re1 in series with m1_d); and, Rpd (pull down)=(Rd2 in series with m4) in parallel with (Re2 in series with m4_d).

Specification of PCI_Express specifies: the nominal Rpu and Rpd to be 50+/−20%; the de-emphasis level to be between 3 dB and 4 dB; and the output signal level to be between 400 mV and 600 mV. From these specifications it is then possible to calculate the ratio of the main driver resistors Rd1 and Re1, as well as the ratio of the de-emphasis driver resistors Rd2 and Re2.

When the output signals of the two differential multiplexers 44 and 164 are opposite—out-of-phase, i.e. A=B_d and B=A_d—the drivers 14 and 114 are in low drive mode and the output signal level—differential voltage—is at an approximate minimum. This corresponds to the de-emphasized state. During the de-emphasized state—and for instance if A=B_d=1 and B=A_d=0–the output impedance is determined as follows:

Rpu (pull up)=(Rd1 in series with m1) in parallel with (Re2 in series with m3_d); and, Rpd (pull down)=(Rd2 in series with m4) in parallel with (Re1 in series with m2_d).

As above from the PCI_Express specifications and the two equations it is again possible to calculate the ratio of the main driver resistors Rd1 and Re1, as well as the ratio of the de-emphasis driver resistors Rd2 and Re2.

In operation, when the de-emphasis driver 114 is in-phase with the main driver 14, the de-emphasis driver 114 adds driving current into the external load—100. Thus the output voltage is emphasized. When the de-emphasis driver 114 is out-of-phase with the main driver 14, the de-emphasis driver 114 steers away driving current from the external load—100. Thus the output voltage is de-emphasized. In both cases—in-phase and out-of-phase—the output impedance is the same.

The de-emphasis unit 100 is highly advantageous by using system components of substantially similar design as the ones of the driver 10, substantially decreasing design and manufacturing cost. Preferably, all components are integrated on a single semiconductor chip, which is facilitated by the use of same-design components for the de-emphasis unit 100 and the driver 10 requiring substantially same manufacturing steps. Further preferably, all components are disposed on the chip in close physical proximity to each other in order to ensure a fully buffered DDR signal which is low in skew and high in speed performance. Knowing system requirements such as PCI_Express specifications for the output signal, it is possible to design the driver 10 and the de-emphasis unit 100 on a computer by executing commands based on the above description stored on a storage medium.

The implementation of the de-emphasis unit 100 according to the invention has been illustrated using a preferred embodiment, but as is evident, is not limited thereto. There are numerous possibilities for implementing signal delay and signal inversion prior provision to a de-emphasis driver. Optionally, but not preferred, the de-emphasis driver is of different design than the main analog driver.

Figure 5:
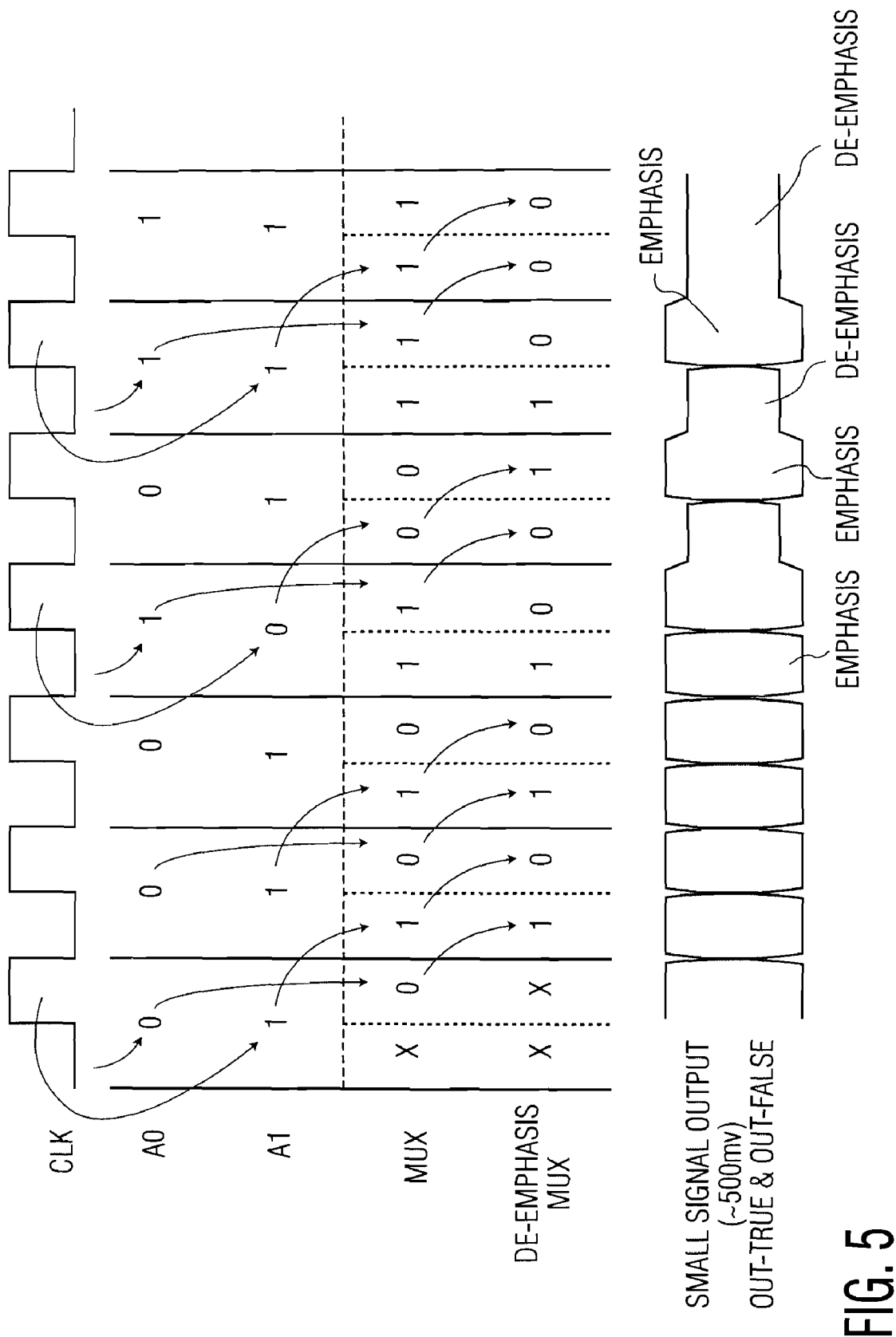

FIG. 5 illustrates schematically an example of a clock signal CLK, input data signals A0 and A1, differential output signal of the differential multiplexer 44 and the differential de-emphasis multiplexer 164, and the corresponding analog output signal provided at ports 18 and 20. From the diagram follows that A0 is latched when CLK is low and multiplexed—differential multiplexer 44—when CLK is high, resulting in a ½ cycle delay. Correspondingly, A1 is latched when CLK is high and multiplexed—differential multiplexer 44—when CLK is low, resulting in a ½ cycle delay. The de-emphasis differential multiplexer 164 provides an output signal that is inverted and delayed by a ½ cycle. When the output signals of the differential multiplexer 44 and the de-emphasis differential multiplexer 164 are of a same polarity, the main driver 14 output signal and the de-emphasis driver 114 output signal are additive resulting in a maximum amplitude of the output signal at port 18 and 20, i.e. emphasis. When the output signals of the differential multiplexer 44 and the de-emphasis differential multiplexer 164 are of a opposite polarity, the main driver 14 output signal and the de-emphasis driver 114 output signal are subtractive resulting in an approximately minimum amplitude of the output signal at port 18 and 20, i.e. de-emphasis.

Numerous other embodiments of the invention will be apparent to persons skilled in the art without departing from the spirit and scope of the invention as defined in the appended claims.

What is claimed is:

1. A method for performing one of emphasizing and de-emphasizing of an analog data signal comprising:

receiving a data signal, the data signal being indicative of bit values of binary data and including two half rate data signal portions;

using a main analog driver, converting the data signal into a first analog data signal;

determining a second data signal by delaying the data signal a predetermined time interval and inverting the delayed data signal;

using a de-emphasis driver, converting the second data signal into a second analog data signal, wherein the second analog data signal is additive to the first analog data signal if the data signal and the second data signal are indicative of a same bit value, and wherein the second analog data signal is subtractive to the first analog data signal if the data signal and the second data signal are indicative of an opposite bit value; and, performing one of emphasizing and de-emphasizing of the first analog data signal by superposing the first analog data signal and the second analog data signal and multiplexing the two half rate data signal portions into a full rate data signal.

2. A method for performing one of emphasizing and de-emphasizing of an analog data signal as defined in claim 1 wherein determining the second data signal comprises:

delaying each of the two half rate data signal portions a predetermined time interval;

inverting the delayed two half rate data signal portions; and, multiplexing the delayed and inverted two half rate data signal portions.

3. A method for performing one of emphasizing and de-emphasizing of an analog data signal as defined in claim 2 wherein the predetermined time interval is half a clock cycle.

4. A system for performing one of emphasizing and de-emphasizing of an analog data signal comprising:

an input port for receiving a data signal, the data signal being indicative of bit values of binary data and including two half rate data signal portions;

a main analog driver in signal communication with the input port for converting the data signal into a first analog data signal;

de-emphasis circuitry in signal communication with the input port for determining a second data signal by delaying the data signal a predetermined time interval and inverting the delayed data signal;

a de-emphasis driver in signal communication with the de-emphasis circuitry and coupled in parallel to the main analog driver, the de-emphasis driver for converting the second data signal into a second analog data signal, wherein the second analog data signal is additive to the first analog data signal if the data signal and the second data signal are indicative of a same bit value, and wherein the second analog data signal is subtractive to the first analog data signal if the data signal and the second data signal are indicative of an opposite bit value; and, an output port in signal communication with the main analog driver and the de-emphasis analog driver, the output port for superposing the first analog data signal and the second analog data signal producing one of an emphasized and de-emphasized first analog data signal and for multiplexing the two half rate data signal portions into a full rate data signal.

5. A system for performing one of emphasizing and de-emphasizing of an analog data signal as defined in claim 4 comprising:

synchronization circuitry in signal communication with the de-emphasis circuitry for providing a clock signal.

6. A system for performing one of emphasizing and de-emphasizing of an analog data signal as defined in claim 5 wherein the input port comprises a first portion for receiving a first half rate data signal portion and a second portion for receiving a second half rate data signal portion.

7. A system for performing one of emphasizing and de-emphasizing of an analog data signal as defined in claim 6 comprising:

a first latch circuitry in signal communication with the first portion of the input port and with the synchronization circuitry, the first latch circuitry for latching the first half rate data signal portion in dependence upon the clock signal;

a second latch circuitry in signal communication with the second portion of the input port and with the synchronization circuitry, the second latch circuitry for latching the second half rate data signal portion in dependence upon the clock signal; and, a main multiplexer in signal communication with the first latch circuitry, the second latch circuitry, the synchronization circuitry, and the main analog driver, the main multiplexer for multiplexing the latched first half rate data signal portion and the latched second half rate data signal portion into a full rate data signal.

8. A system for performing one of emphasizing and de-emphasizing of an analog data signal as defined in claim 7 wherein the de-emphasis circuitry comprises:

a first de-emphasis latch circuitry in signal communication with the first latch circuitry and with the synchronization circuitry;

a second de-emphasis latch circuitry in signal communication with the second latch circuitry and with the synchronization circuitry; and, a de-emphasis multiplexer in signal communication with the first de-emphasis latch circuitry, the second de-emphasis latch circuitry, the synchronization circuitry, and the de-emphasis driver.

9. A system for performing one of emphasizing and de-emphasizing of an analog data signal as defined in claim 8 wherein the first de-emphasis latch circuitry, the second de-emphasis latch circuitry, and the de-emphasis multiplexer are of a substantially same design as the first latch circuitry, the second latch circuitry, and the main multiplexer, respectively.

10. A system for performing one of emphasizing and de-emphasizing of an analog data signal as defined in claim 9 wherein the de-emphasis driver is of a substantially same design as the main analog driver.

11. A system for performing one of emphasizing and de-emphasizing of an analog data signal as defined in claim 10 wherein the de-emphasis driver and the main analog driver are designed such that output impedance is a same for the emphasized and the de-emphasized first analog data signal.

12. A system for performing one of emphasizing and de-emphasizing of an analog data signal as defined in claim 10 wherein the de-emphasis driver and the main analog driver are 50Ω voltage drivers.

13. A system for performing one of emphasizing and de-emphasizing of an analog data signal as defined in claim 12 wherein the de-emphasis driver and the main analog driver are all Nmos push-pull 50Ω voltage source D2A drivers.

14. A system for performing one of emphasizing and de-emphasizing of an analog data signal as defined in claim 12 wherein the de-emphasis driver and the main analog driver are designed to meet PCI_Express specifications for the first analog signal.

15. A system for performing one of emphasizing and de-emphasizing of an analog data signal as defined in claim 10 wherein the first latch circuitry, the second latch circuitry, the main multiplexer, main analog driver, the first de-emphasis latch circuitry, the second de-emphasis latch circuitry, the de-emphasis multiplexer, and the de-emphasis driver are integrated on a single semiconductor chip.

16. A system for performing one of emphasizing and de-emphasizing of an analog data signal as defined in claim 15 wherein the first latch circuitry, the second latch circuitry, the main multiplexer, main analog driver, the first de-emphasis latch circuitry, the second de-emphasis latch circuitry, the de-emphasis multiplexer, and the de-emphasis driver are disposed in close physical proximity to each other.

17. A storage medium having data stored therein, the data for when executed resulting in an integrated circuit design of a system for performing one of emphasizing and de-emphasizing of an analog data signal comprising:
an input port for receiving a data signal, the data signal being indicative of bit values of binary data and including two half rate data signal portions;
a main analog driver in signal communication with the input port for converting the data signal into a first analog data signal;
de-emphasis circuitry in signal communication with the input port for determining a second data signal by delaying the data signal a predetermined time interval and inverting the delayed data signal;
a de-emphasis driver in signal communication with the de-emphasis circuitry and coupled in parallel to the main analog driver, the de-emphasis driver for converting the second data signal into a second analog data signal, wherein the second analog data signal is additive to the first analog data signal if the data signal and the second data signal are indicative of a same bit value, and wherein the second analog data signal is subtractive to the first analog data signal if the data signal and the second data signal are indicative of an opposite bit value; and,
an output port in signal communication with the main analog driver and the de-emphasis analog driver, the output port for superposing the first analog data signal and the second analog data signal producing one of an emphasized and de-emphasized first analog data signal and for multiplexing the two half rate data signal portions into a full rate data signal.

18. A method for performing one of emphasizing and de-emphasizing of an analog data signal comprising: receiving a data signal including two half rate data signal portions, the data signal being indicative of bit values of binary data; using a main analog driver, converting the data signal into a first analog data signal; determining a second data signal by delaying the data signal a predetermined time interval and inverting the delayed data signal; using a de-emphasis driver, converting the second data signal into a second analog data signal, wherein the second analog data signal is additive to the first analog data signal if the data signal and the second data signal are indicative of a same bit value, and wherein the second analog data signal is subtractive to the first analog data signal if the data signal and the second data signal are indicative of an opposite bit value; and, performing one of emphasizing and deemphasizing of the first analog data signal by superposing the first analog data signal and the second analog data signal and by multiplexing the two half rate data signal portions into a full rate data signal.

19. A method for performing one of emphasizing and de-emphasizing of an analog data signal as defined in claim 18 characterized in that determining the second data signal comprises: delaying each of the two half rate data signal portions a predetermined time interval; inverting the delayed two half rate data signal portions; and, multiplexing the delayed and inverted two half rate data signal portions.

20. A system for performing one of emphasizing and de-emphasizing of an analog data signal comprising: an input port for receiving a data signal including two half rate data signal portions, the data signal being indicative of bit values of binary data; a main analog driver in signal communication with the input port for converting the data signal into a first analog data signal; de-emphasis circuitry in signal communication with the input port for determining a second data signal by delaying the data signal a predetermined time interval and inverting the delayed data signal; a de-emphasis driver in signal communication with the de-emphasis circuitry and coupled in parallel to the main analog driver, the de-emphasis driver for converting the second data signal into a second analog data signal, wherein the second analog data signal is additive to the first analog data signal if the data signal and the second data signal are indicative of a same bit value, and wherein the second analog data signal is subtractive to the first analog data signal if the data signal and the second data signal are indicative of an opposite bit value; and, an output port in signal communication with the main analog driver and the de-emphasis analog driver, the output port for superposing the first analog data signal and the second analog data signal producing one of an emphasized and de-emphasized first analog data signal and for multiplexing the two half rate data signal portions into a full rate data signal.

21. A system for performing one of emphasizing and de-emphasizing of an analog data signal as defined in claim 20 comprising: synchronization circuitry in signal communication with the de-emphasis circuitry for providing a clock signal.

22. A system for performing one of emphasizing and de-emphasizing of an analog data signal as defined in claim 20, characterized in that the input port comprises a first portion for receiving a first half rate data signal portion and a second portion for receiving a second half rate data signal portion.

23. A system for performing one of emphasizing and de-emphasizing of an analog data signal as defined in claim 21, characterized in that the input port comprises a first portion for receiving a first half rate data signal portion and a second portion for receiving a second half rate data signal portion.

24. A system for performing one of emphasizing and de-emphasizing of an analog data signal as defined in claim 22 comprising: a first latch circuitry in signal communication with the first portion of the input port and with the synchronization circuitry, the first latch circuitry for latching the first half rate data signal portion in dependence upon the clock signal; a second latch circuitry in signal communication with the second portion of the input port and with the synchronization circuitry, the second latch circuitry for latching the second half rate data signal portion in dependence upon the clock signal; and, a main multiplexer in signal communication with the first latch circuitry, the second latch circuitry, the synchronization circuitry, and the main analog driver, the main multiplexer for multiplexing the latched first half rate data signal portion and the latched second half rate data signal portion into a full rate data signal.

25. A system for performing one of emphasizing and de-emphasizing of an analog data signal as defined in claim 24 wherein the de-emphasis circuitry comprises: a first de-emphasis latch circuitry in signal communication with the first latch circuitry and with the synchronization circuitry; a second de-emphasis latch circuitry in signal communication with the second latch circuitry and with the synchronization circuitry; and, a de-emphasis multiplexer in signal communication with the first de-emphasis latch circuitry, the second de-emphasis latch circuitry, the synchronization circuitry, and the de-emphasis driver.

26. A system for performing one of emphasizing and de-emphasizing of an analog data signal as defined in claim 20, wherein the de-emphasis driver and the main analog driver are designed such that output impedance is the same for the emphasized and the de-emphasized first analog data signal.

27. A storage medium having data stored therein, the data for when executed resulting in an integrated circuit design of a system for performing one of emphasizing and de-emphasizing of an analog data signal comprising: an input port for receiving a data signal, the data signal being indicative of bit values of binary data and including two half rate data signal portions; a main analog driver in signal communication with the input port for converting the data signal into a first analog data signal; de-emphasis circuitry in signal communication with the input port for determining a second data signal by delaying the data signal a predetermined time interval and inverting the delayed data signal; a de-emphasis driver in signal communication with the de-emphasis circuitry and coupled in parallel to the main analog driver, the de-emphasis driver for converting the second data signal into a second analog data signal, wherein the second analog data signal is additive to the first analog data signal if the data signal and the second data signal are indicative of a same bit value, and wherein the second analog data signal is subtractive to the first analog data signal if the data signal and the second data signal are indicative of an opposite bit value; and, an output port in signal communication with the main analog driver and the de-emphasis analog driver, the output port for superposing the first analog data signal and the second analog data signal producing one of an emphasized and de-emphasized first analog data signal and for multiplexing the two half rate data signal portions into a full rate data signal.

* * * * *